United States Patent [19]

DeVlieg et al.

[11] 4,410,952
[45] * Oct. 18, 1983

[54] METHOD AND APPARATUS FOR GENERATING NOSE WHEEL SPEED SIGNALS

[75] Inventors: Garrett H. DeVlieg; Andrew M. Valaas, both of Bellevue, Wash.

[73] Assignee: The Boeing Company, Seattle, Wash.

[*] Notice: The portion of the term of this patent subsequent to Mar. 30, 1999 has been disclaimed.

[21] Appl. No.: 290,623

[22] Filed: Aug. 5, 1981

Related U.S. Application Data

[63] Continuation-in-part of Ser. No. 141,441, Apr. 18, 1980, Pat. No. 4,322,809.

[51] Int. Cl.³ ............................................. B60T 8/02
[52] U.S. Cl. ..................................... 364/565; 364/426; 303/96; 303/109
[58] Field of Search ............. 364/426, 565; 340/27 R; 244/111; 303/96, 106, 109

[56] References Cited

U.S. PATENT DOCUMENTS

| | | | |
|---|---|---|---|
| 3,712,122 | 1/1973 | Harris et al. | 340/27 R |
| 3,802,749 | 4/1974 | Carp et al. | 303/96 |
| 3,870,378 | 3/1975 | Carp | 303/96 |
| 4,053,188 | 10/1977 | Jonner | 303/96 |
| 4,076,331 | 2/1978 | DeVlieg | 244/111 |
| 4,134,621 | 1/1979 | Smedley et al. | 303/109 |
| 4,164,872 | 8/1979 | Weigl | 303/96 |
| 4,322,809 | 3/1982 | DeVlieg et al. | 364/426 |

Primary Examiner—Gary Chin
Attorney, Agent, or Firm—Conrad O. Gardner; B. A. Donahue; Nicolaas DeVogel

[57] ABSTRACT

Left and right main gear wheel speed signals are processed by a circuit which is a model of aircraft rigid body motion to provide a synthesized nose wheel velocity representative signal.

3 Claims, 3 Drawing Figures

METHOD AND APPARATUS FOR GENERATING NOSE WHEEL SPEED SIGNALS

This application is a continuation-in-part of application Ser. No. 141,441 filed Apr. 18, 1980 now U.S. Pat. No. 4,322,809.

This invention relates to generation of signals representative of wheel speed of an aircraft and more particularly signals representative of nose wheel speed.

Heretofore, the output of an anti-skid generator has been utilized for calculating aircraft acceleration during takeoff as is shown in U.S. Pat. No. 2,947,502. Also, an aircraft touchdown indicating system as shown in U.S. Pat. No. 3,500,307 has utilized signals from tachometer generators on left and right main wheels to provide the indications.

U.S. Pat. No. 4,134,621 has provided signals representative of wheel velocity on both sides of a vehicle to a circuit which selects the highest of the input circuits. This is used only for anti-wheel lock control, and is not used for synthesizing velocity at some other point of the vehicle.

U.S. Pat. Nos. 3,802,749 and 3,870,378 have provided two signals representative of the velocity of two wheels to a comparator circuit. One signal is scaled differently than the other and the comparator output is low when the first signal exceeds the second signal times a constant. In contrast, the present invention differs in that the output of the operational amplifiers in accordance with an embodiment of the present invention is a continuous signal equal to the difference of the first input signal times a first constant and the second input signal times a second constant rather than a bistable high or low signal as described in aforementioned U.S. Pat. Nos. 3,802,749 and 3,870,378.

Utilization of additional transducers to provide nose wheel speed signals requires nose wheel axle design for their incorporation thereon and further increases weight thereof.

Accordingly, it is an object of this invention to provide means for generating nose wheel speed signals without requiring utilization of nose gear transducers.

It is a further object of this invention to provide means for synthesizing nose wheel speed signals from main gear wheel speed signals.

It is another object of this invention to provide a method for deriving nose wheel speed representative signals from main gear wheel speed signals incorporating selection of the largest one of a plurality of signals.

It is still another object of this invention to provide a means for approximating nose gear wheel speed with a maximum error of less than about four percent between nose gear steering limits of about plus or minus sixty-five degrees.

Further objects and features of the present invention will become apparent in the course of the reading of the following specification and drawings wherein.

Figure 1:
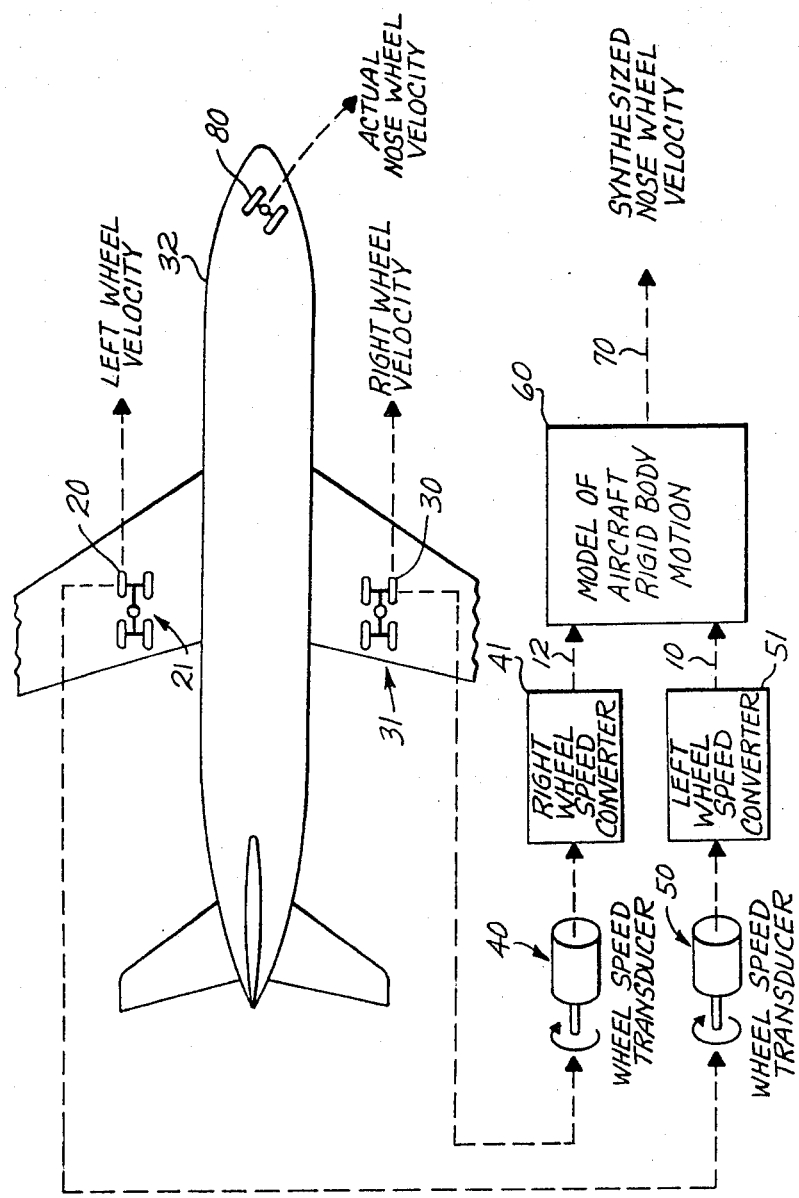
FIG. 1 is a block diagram of the present method and apparatus for generating nose wheel speed signals.

Turning now to FIG. 1, it will be observed that left and right main gear wheel speeds 10 and 12 respectively are developed from outboard wheels 20 and 30 of trucks 21 and 31 on respective left and right sides of the aircraft 32. Wheel speed transducers 40 and 50 conventionally counted (and already present as a portion of the aircraft anti-skid system, not shown) at wheels 30 and 20 respectively are coupled to conventional right and left wheel speed converter circuits 41 and 51 respectively to provide signals 12 and 10 representative respectively of outboard right main gear wheel 30 and outboard left main gear wheel 20. A converter circuit 60 converts signals 12 and 10 representative of outboard right main gear wheel speed and outboard left main gear wheel speed respectively into a synthesized nose wheel velocity signal 70 representative of actual nose gear wheel 80 wheelspeed. The conversion is a computation based on the rigid body motion of the aircraft and is given by $$V_N = \tfrac{1}{2}\sqrt{\frac{4L^2}{T^2}(V_O - V_I)^2 + (V_O + V_I)^2}$$

where $V_N$ is the synthesized nose wheel velocity, $V_O$ and $V_I$ are the velocity of the main gear wheels on the outside and the inside of the turn, L is the length of the body between the nose gear and the main gear, and T is the track (width) between the left and right main gear wheels.

Figure 2:
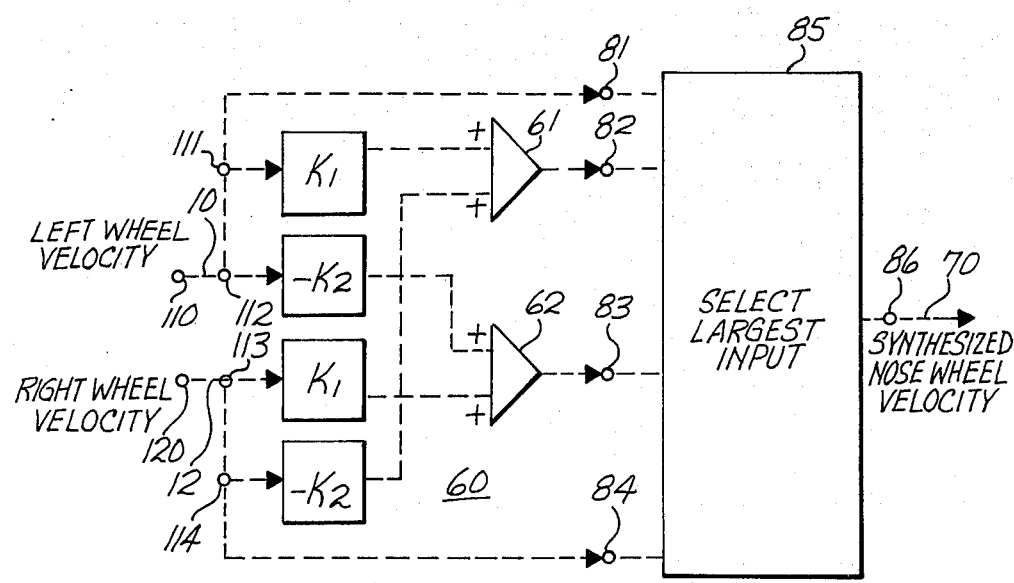
FIG. 2 is a schematic diagram of a wheel speed converter circuit embodiment of the model of aircraft rigid body motion of the system of FIG. 1.

FIG. 2 is one embodiment, viz. an analog circuit implementation of the model of aircraft rigid body motion shown in block form in the system of FIG. 1, and is based on a linear approximation of the exact solution. The following theory of operation of approximation of nose wheel velocity from from main gear wheel velocity as provided in converter circuit 60 is helpful in understanding the basic operation of converter circuit 60:

For steered angles below about thirty degrees, the velocity of the outboard main gear wheels approximates the velocity of the nose gear wheels within about five percent. Above about thirty degrees, the velocity of the nose gear wheels is to a close approximation:

$$V_N = 1.8 V_O - 1.1 V_I$$

where $V_N$ is nose gear wheel velocity and $V_O$ and $V_I$ are the velocity of the main gear (outboard wheels) on the outside and inside of the turn. Since both left and rights turns are possible, the desired approximation of nose wheel velocity is indicated by the greater amplitude of the following:

(a) left outboard main gear wheel velocity ($V_L$)
(b) right outboard main gear wheel velocity ($V_R$)
(c) $1.8 V_L - 1.1 V_L$
(d) $1.8 V_R - 1.1 V_L$ Turning now more specifically to the converter circuit embodiment 60 in FIG. 2, it can be seen that first input terminal 110 is connected to input terminals 111 and 112 respectively of first and second non-inverting summing amplifier circuit means 61 and 62 having respective positive and negative gains of $K_1 = 1.8$ and $K_2 = 1.1$ while second input terminal 120 is connected to input terminals 113 and 114 respectively of second and first amplifier circuits means 62 and 61 having respective positive and negative gains of $K_1 = 1.8$ and $K_2 = 1.1$. The output of first amplifier circuit means 61 is coupled to second input terminal 82 of select largest input circuit 85.

The output of second amplifier circuit means 62 is coupled to third input terminal 83 of select largest input circuit 85.

Input terminal 111 of first amplifier circuit means 61 is connected to first input terminal 81 of select largest input circuit 85 while input terminal 114 of fourth amplifier circuit means 62 is connected to fourth input terminal 84 of select largest input circuit 85. Select largest input circuit 85 may comprise e.g. a diode connected in series with each of input terminals 81, 83, 83, and 84 and connected to a common point such as the input resistor of an operational amplifier. Output terminal 86 of select largest input circuit 85 provides synthesized nose wheel velocity signal 70 which is the largest amplitude one of the plurality of signals present at input terminals 81, 82, 83, and 84 in the manner hereinbefore discussed in terms of theory of operation of converter circuit 60. Synthesized nose wheel velocity signal 70 may then be coupled to display means (not shown) for the pilot or other utilization means. Display of nose wheel velocity signal 70 can be utilized by the pilot in observing lateral acceleration limits for the aircraft.

Figure 3:
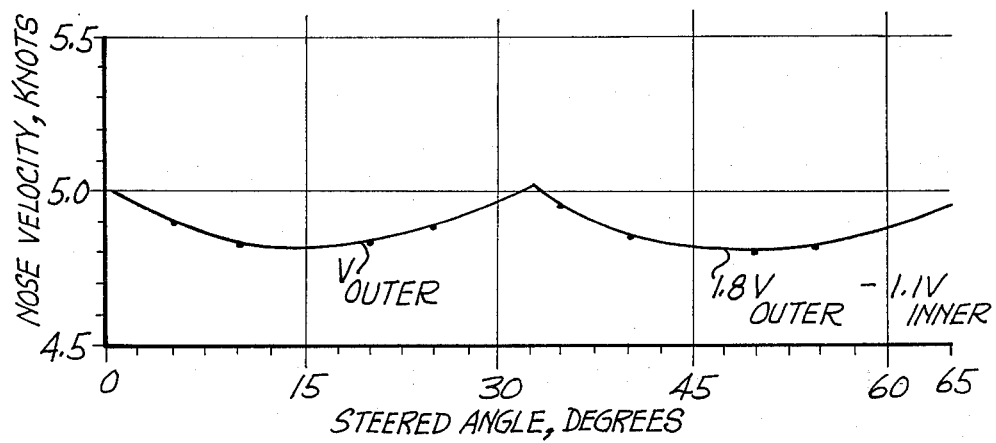
FIG. 3 is a graph showing the solution provided by the circuit embodiment of FIG. 2.

The actual nose wheel velocity resulting from maintaining a constant indicated five knot nose wheel velocity in accordance with the system of FIG. 1 incorporating the converter circuit of FIG. 2 can now be seen from FIG. 3. An observation of the plot of FIG. 3 shows the present method and apparatus to provide a maximum error of about four percent between the nose gear steering limits of plus or minus sixty-five degrees.

Further, variations of the present method include an exact synthesis or more approximate synthesis of nose wheel velocity. It can be seen, therefore, that in accordance with the present method, speed at any point on or external to the aircraft may be synthesized utilizing speed of two wheels.

It should be further recognized within the spirit and scope of the present invention that, for example, the wheel speeds may be synthesized by a more exact method, such as by utilization of a microprocessor circuit, or a more approximate method such as by simply selecting the largest wheel speed value. Also, the present invention is not limited to synthesizing nose wheel speed, but may be utilized to synthesize the speed of any point on or off the aircraft which remains fixed relative to the aircraft such as e.g. aircraft center of gravity, wing tip, tail, or point in advance of the nose of the aircraft. Those skilled in the art will further appreciate that the teaching of the present invention may be utilized to synthesize accelerations or displacements of points on or off the aircraft that remain fixed relative to the aircraft such as by differentiating or integrating the synthesized velocity.

We claim:

1. Method of indicating the nose wheel velocity of an aircraft to a pilot of the aircraft for controlling lateral acceleration limits of the aircraft including the steps of:
   providing a signal representative of left main gear wheel velocity;
   providing a signal representative of right main gear wheel velocity;
   computing a value representative of nose wheel velocity utilizing an equation derived from rigid body motion of said aircraft, wherein said equation is:

$$V_N = \frac{1}{2}\sqrt{\frac{4L^2}{T^2}(V_L - V_R)^2 + (V_L + V_R)^2}$$

where $V_N$ is the synthesized nose wheel velocity, L is the length of the body between nose gear and main gear, $V_L$ is the velocity of said left main gear wheel, $V_R$ is the velocity of said right main gear wheel, said right main gear wheel symmetrically opposed to said left main gear wheel, and T is the track width between left and right main gear wheels;
   providing a signal proportional to the computed value representative of nose wheel velocity;
   utilizing such signal to drive a display indicating nose wheel velocity; and
   then, utilizing said computed nose wheel velocity for controlling the lateral acceleration limits of the aircraft.

2. A converter circuit for generating nose wheel speed signals from main landing wheel speed signals, said converter having:
   a first converter input terminal;
   a second converter input terminal;
   a converter output terminal;
   said first converter input terminal responsive to a signal $V_L$ representative of left main gear wheel velocity;
   said second converter input terminal responsive to a signal $V_R$ representative of right main gear wheel velocity;
   first means for providing a signal representative of $K_1V_L - K_2V_R$; and,
   second means for providing a signal representative of $K_1V_R - K_2V_L$ where $K_1$ and $K_2$ are fixed constants;
   a select largest circuit having an output terminal coupled to said converter output terminal, said select largest circuit selecting the largest of said signals representative of $V_L$, $V_R$, $K_1V_L - K_2V_R$, and $K_1V_R - K_2V_L$ to provide said nose wheel signals.

3. The invention according to claim 2 wherein said fixed constants $K_1$ and $K_2$ equal about 1.8 and 1.1 respectively.

* * * * *